Dec. 9, 1958   M. A. STEINBERG   2,863,759
PURIFICATION OF LIQUID METAL REACTOR COMPOSITIONS
Filed July 2, 1957
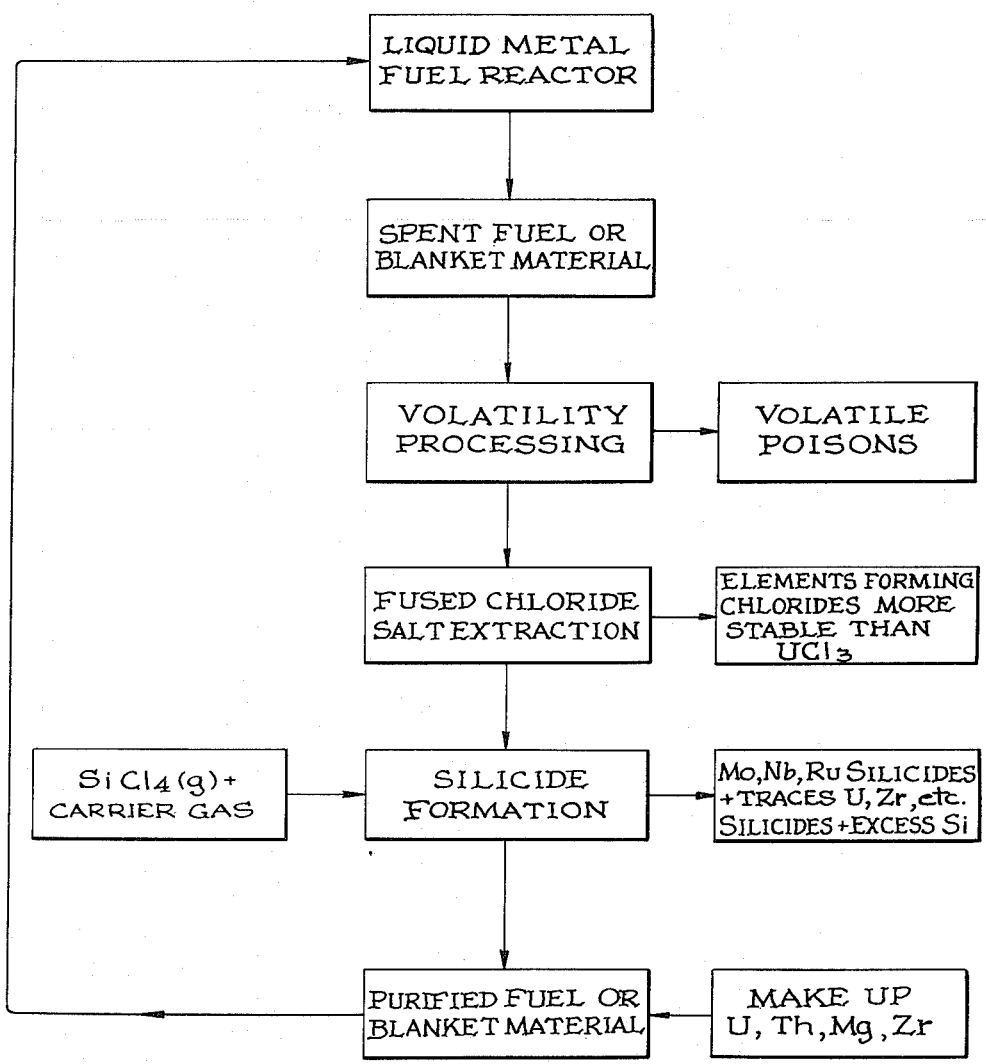
INVENTOR.
MORRIS A. STEINBERG
BY Lawrence J. Field
ATTORNEY

2,863,759
PURIFICATION OF LIQUID METAL REACTOR COMPOSITIONS

Morris A. Steinberg, University Heights, Ohio, assignor to Horizons Incorporated, a corporation of New Jersey Application July 2, 1957, Serial No. 669,434

1 Claim. (Cl. 75—70)

This invention relates to the removal of impurities from a liquid metal composition. More particularly it relates to the purification and regeneration of a liquid metal system suitable for use in a nuclear reactor.

One of the more extensively investigated reactor systems for power regeneration was described in detail in a series of articles published in Nucleonics, volume 12, No. 7, July 1954, beginning on page 11. The reactor employs a liquid metal solution or dispersion as fuel and as breeder material. As reported further in the June 1957 Journal of the Electrochemical Society, an intermetallic compound of either U or Th dispersed in liquid bismuth is one of the more promising of the media investigated. In service both the fuel and the breeder blanket are continuously undergoing nuclear reactions and as a result, fission products are produced which, if not separated from the fuel or breeder material, would eventually poison them. The fuel and breeder circulate as separate streams and are processed independently. The present invention is applicable to the processing of either of these streams and will be described for the processing of the fuel stream for purposes of illustration, although it will be understood that at most only minor changes may be required to adapt it to the processing of the breeder material.

In one extensively examined system, the fuel is a dilute solution of uranium, magnesium and zirconium in liquid bismuth, and the blanket material is a slurry of solid thorium bismuthide in liquid bismuth prepared as described in the above mentioned publications. It has been calculated that in a thirty-day period if 2% of the $U^{235}$ in the fuel were consumed, the fission products would be as follows:

| Element: | Atomic percent |
|---|---|
| Zr | 15.0 |
| Mo | 9.20 |
| Xe | 9.17 |
| Ce | 9.00 |
| Nd | 7.90 |
| Ru | 7.88 |
| Cs | 7.83 |
| Sr | 6.6 |
| Ba | 4.57 |
| La | 3.18 |
| Tc | 3.14 |
| Nb | 2.75 |
| Y | 2.66 |
| Pr | 2.26 |
| Kr | 2.14 |
| Te | 1.60 |
| Rb | 1.21 |
| Sm | 1.11 |
| Pm | 0.73 |
| I | 0.73 |
| All others [1] | 1.45 |

[1] Principally Ag, Cd, As, Pd, Po, Rh, Se, Sb, Ge, Sn and In.

In the recovery system forming the present invention fission products with very short half lives may be disregarded; these include Cr, Fe, Ni, Pb and Zn and it is further assumed that the material to be processed has been purified to some extent and that it, therefore, contains only those poisons which are not removed by other preliminary purifications. The gaseous fission products, particularly $Xe^{135}$ and I are removed by any presently known technique, e. g., sparging the fuel with an inert gas as it leaves the core or by simple desorption, both means being known for effecting the removal of fission products which are gaseous or volatile at the temperature of operation. Thereafter, non-volatile poisons which form chlorides which are thermodynamically more stable than uranium trichloride are removed from the material from which the volatile products have previously been removed, by extraction with fused alkali metal chlorides, alkaline earth chlorides or mixtures of alkali and/or alkaline earth chlorides, accompanied by oxidation by means of bismuth trichloride ($BiCl_3$), if desired. In this manner fission products comprised of elements of group IA, IIA and IIIA and the rare earth elements are all removed from the nuclear fuel being reprocessed. The remaining fission product poisons are principally zirconium, molybdenum, rhodium, polonium, ruthenium, and niobium, which possess undesirably high neutron-cross sections. In accordance with the present invention, there is provided a simple and effective way of diminishing the amount of such elements in the reprocessed fuel.

In the purification process contemplated by me, the liquid bismuth stripped of the volatile fission products and the fission products whose chlorides are more stable than uranium chloride ($UCl_3$) is sparged with a mixture of hydrogen gas and silicon tetrachloride gas. The two gases react to provide atoms of active silicon which combine with the silicide-forming fission products not yet removed. The silicides of molybdenum, zirconium, ruthenium, niobium and the other silicide-forming impurities present, form readily in the molten bismuth and on cooling the molten metal is readily separable from the large crystals of solid silicides by purely physical techniques, such as filtration or cyclone separation.

It will be noted that silicon may be present in excess without any untoward side effects, principally because of the comparatively low neutron cross section for Si and because of the low solubility of silicon in bismuth and because no compounds appear to form in the Bi—Si system. For these reasons, it is possible to introduce the $SiCl_4$ into the material to be purified by bubbling hydrogen through $SiCl_4$ to form a vapor of hydrogen saturated with $SiCl_4$ vapor, since any excess silicon can be tolerated.

It will be seen that an effective method has been developed for removing silicide-forming fission products from spent fuel and breeder blanket liquid metal compositions, as a further step in their purification after other fission products have been removed by commonly practiced preliminary treatments. A graphical illustration of the process of the invention as applied to a fuel stream is depicted in the accompanying flowsheet.

Having now described my invention in accordance with the patent statutes, I claim:

In a method of processing bismuth compositions from which volatile fission products and fission products whose chlorides are more stable than uranium chloride have been removed by preliminary treatment, the improvement which comprises: removing those remaining fission products which form silicides by passing silicon tetrachloride and hydrogen into the treated bismuth composition and separating the solid silicides formed therein from the remaining liquid metal composition.

References Cited in the file of this patent

UNITED STATES PATENTS 2,205,387   Betterton et al. _____ June 25, 1940